Jan. 17, 1961

R. S. CARTER 2,968,714

EXPANDABLE WELDED HONEYCOMB

Filed June 12, 1958

INVENTOR.
Rowland S. Carter
BY
Townsend and Townsend
attorneys

Jan. 17, 1961 R. S. CARTER 2,968,714
EXPANDABLE WELDED HONEYCOMB
Filed June 12, 1958 2 Sheets-Sheet 2
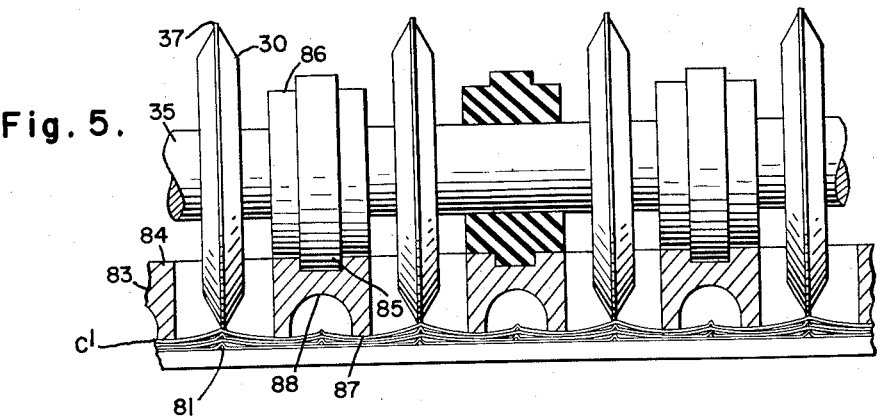
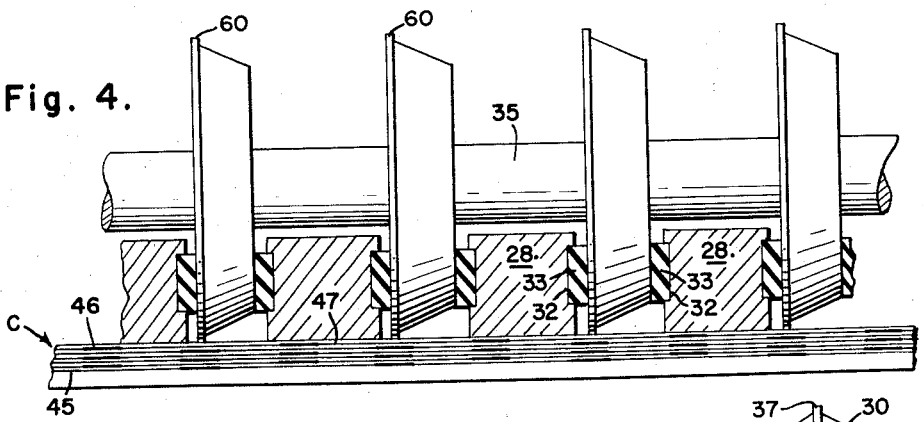
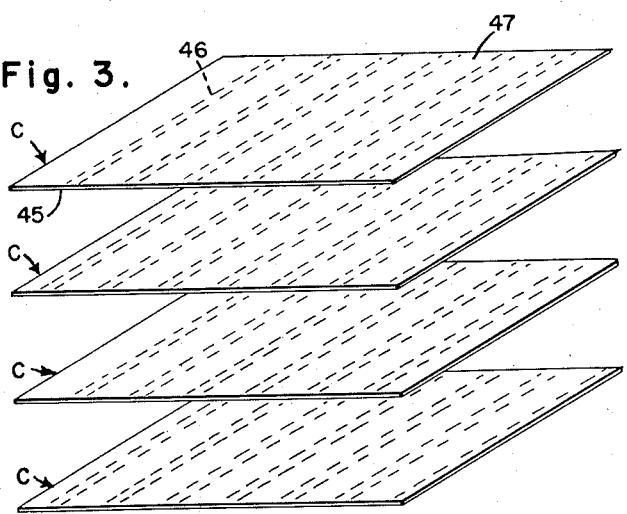
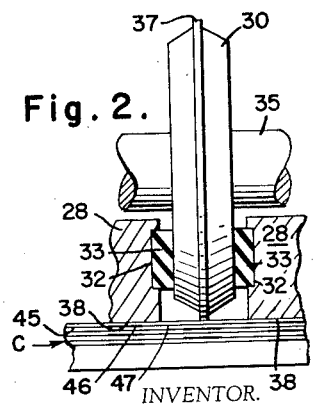
INVENTOR.
Rowland S. Carter
BY
Townsend and Townsend
attorneys United States Patent Office 2,968,714
Patented Jan. 17, 1961

2,968,714

EXPANDABLE WELDED HONEYCOMB

Rowland S. Carter, Los Angeles, Calif., assignor to Hexcel Products Inc., Berkeley, Calif., a corporation of California Filed June 12, 1958, Ser. No. 741,540

16 Claims. (Cl. 219—117)

This invention relates to a method of and means for welding coplanar stacked sheets of metal foil together so that the stack may be thereafter expanded to form honeycomb core.

A principal object of this invention is to form honeycomb by a novel means of welding the seams between sheets of metal foil together while the sheets are in flat stacked relation.

A further object of this invention is to weld seams between stacked sheets of metal foil so that the seams are in parallel spaced relation and the seams on one side of each sheet are interposed between seams on the opposite sides of the sheet so that when the structure is expanded there is formed an integral honeycomb structure having substantially rectangular cells.

A still further object of this invention is to provide welding electrodes arranged to form continuous seam welds between superposed sheets of metal foil in which the electrodes are arranged in contact with only the top face of one of the two sheets and causes a primary circuit of welding current to pass through the top sheet to the second sheet and back to the electrode to weld the two sheets together.

A still further object of this invention is to provide means to insulate preselected areas of two superposed sheets of metal foil to prevent welding of the two sheets together in areas where welds would be undesirable.

A feature and advantage of this invention is that the insulating means allows the welding of seams to be restricted to the two top sheets of material so that the sheets underneath the two top sheets will not be welded by the welding current.

Another feature and advantage of this invention is that the previously welded sheets provide a return path for welding current so that the electrodes supplying the welding current need contact only the top face of the top sheet of metal foil.

Another object of this invention is to provide novel insulating strips having a high moisture and dielectric content between two adjacent sheets of metal foil to electrically and thermally insulate the two sheets.

A still further object of this invention is to prevent the sheet material from burning during welding by employing the electrically insulated material having a high moisture content which will evaporate during the welding operation so as to effectively cool the material.

A still further object of this invention is to provide a process of welding superposed sheets of metal foil together wherein a top sheet of foil is insulated from a second sheet along lines on both sides of seams to be welded and second and third sheets are insulated from one another along lines aligned with the seam to be welded between the first and second sheet and electrical current is applied along the top sheet along the seams to be welded to effect welding of the seams to join the first two sheets together.

A further object of this invention is to provide a method of welding superposed sheets in which areas alongside of and under the seams to be welded are coated with a material having sufficient moisture so as to cause sufficient evaporation during the weld to cool the sheets of material against burning adjacent the welds.

Still another object of this invention is to provide a novel welding electrode arrangement wherein one electrode is formed by a plurality of parallel fixed guides and the other electrode is formed by a plurality of welding wheels reciprocally movable between the guides.

Other objects of the present invention will become apparent upon reading the following specification and referring to the accompanying drawings in which similar characters of reference represent corresponding parts in each of the several views.

In the drawings:

Fig. 2 is a front elevation of an enlarged welding wheel.

Fig. 3 is a perspective view of a plurality of sheets of metal foil shown in their respective relationship for welding and having indicated thereon the electrical and thermal insulating strips for insulating the sheets one from the other.

Fig. 4 is a front elevation of another embodiment of the invention showing welding wheels of slightly different structure.

Fig. 5 is a front elevation of still another embodiment of the invention in which the insulation between sheets of material is effected by corrugated protuberances preformed in the respective sheets.

Figure 1:
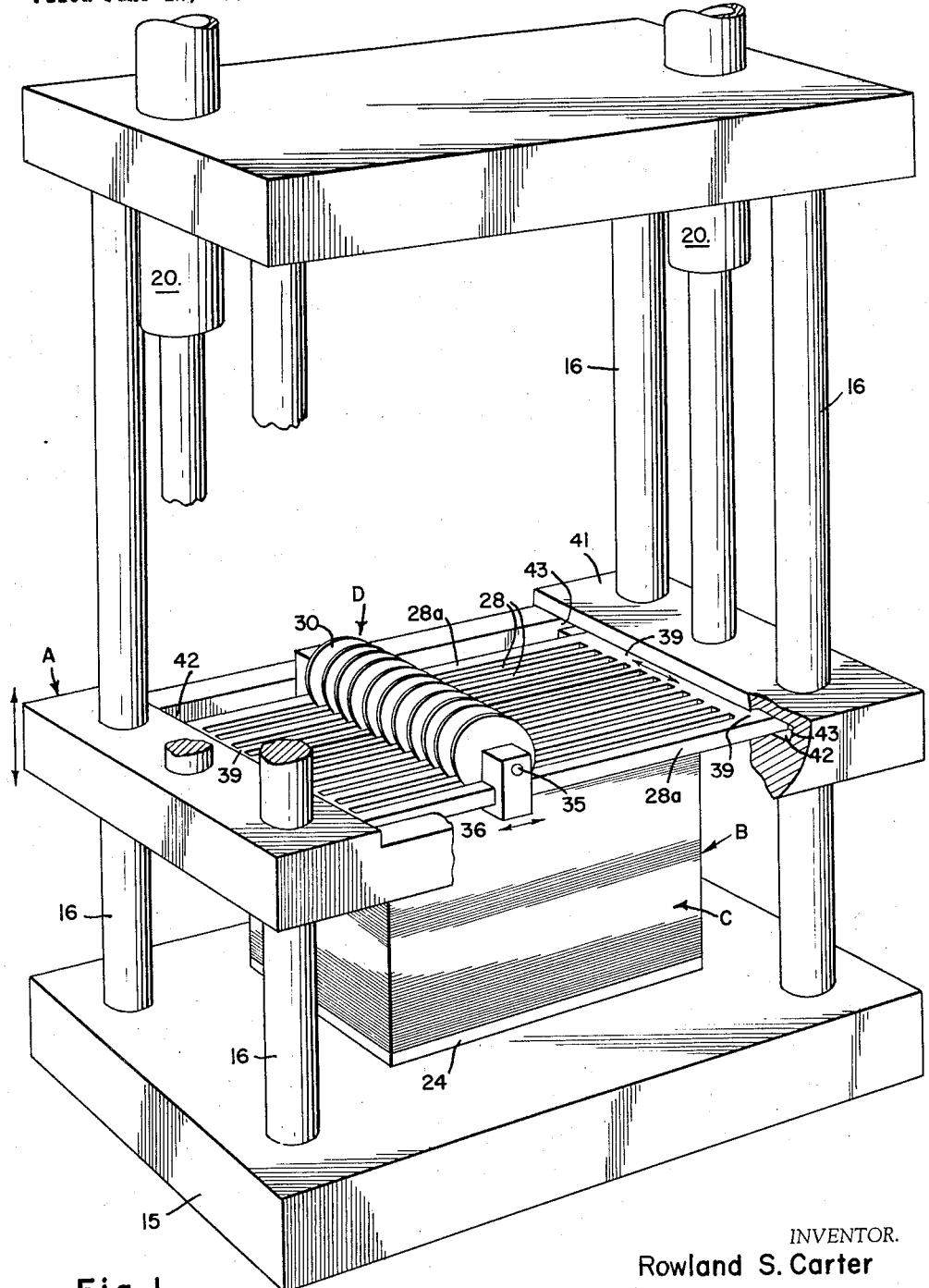
Fig. 1 is a perspective view of one embodiment of the invention.

In the principal embodiment of the invention as illustrated in Figs. 1, 2 and 3 there is provided a vertically reciprocally movable carriage A with a work area B under the carriage where sheets of foil C are progressively stacked and welded together via welding contacts carried by electrodes D mounted on the carriage.

Carriage mechanism A is mounted over a base 15 which forms the base for work area B and upon which is mounted four vertical parallel spaced carriage support members 16. Carriage mechanism A is slidably mounted on members 16 and is raised and lowered by pneumatic motors 20 so that the carriage height with respect to the work area may be regulated.

A dielectric plate 24 is mounted on base 15 immediately under welding carriage A. Plate 24 is arranged as a base to receive sheets C in stacked relation so that the sheets on the plate are in alignment with electrodes D on carriage A.

Sheets C are placed on the insulated plate 24 in superposed relationship one at a time. After each sheet is stacked welding electrodes D are arranged to weld seams between the top sheet and the next adjacent sheet by traversing one set of electrodes of the welding electrode D over the top sheet of foil. Pneumatic motors 20 are arranged to force carriage A down to compress the electrodes tightly against top sheet C. By this means mechanical pressure is exerted at the nodes during the welding operation.

Electrode D comprises an assembly of electrode guides 28 and electrode wheels 30 reciprocally movable between the guides. Guides 28 are formed of rail like members which are in relatively parallel equally spaced alignment and disposed on carriage A in parallel relation with base 15 and plates 24. The wheel electrodes are arranged to traverse in the spaces between guides 28 with the side portion of each wheel making contact with the sides of the guides so that the guides in addition to forming one electrode for the mechanism form a guide to properly align the movement of the welding wheels in a fixed path.

The side wall of each guide 28 is recessed longitudinally as at 32 and is provided with a strip of insulating material 33 in the recess which functions to engage and hold wheel electrode 30 in alignment between two guides to electrically insulate electrode guides 28 and electrode wheels 30.

Welding wheels 30 are mounted on a common shaft 35, the hubs 36 of which are slidably mounted along the two outer guide members 28ª. Axle 35 is positioned so that the rim 37 of each welding wheel 30 projects to a point slightly below the bottom face 38 of guides 28. Guides 28 are mounted as an integral assembly whereat their end portions are joined by end members 39. The entire integral guide member is constructed of highly conductive material such as copper, brass or bronze. In similar fashion wheel electrodes 30 are formed of similarly highly conductive and preferably an extremely hard material.

Electrode mechanism D is horizontally reciprocally movable with respect to carriage mechanism A in a direction transverse the longitudinal axis of guides 28 and the path of electrode wheel movement between guides 28. Horizontal reciprocal movement is effected by forming carriage mechanism A with a frame 41 which is vertically reciprocally mounted on support members 16. Frame 41 is provided with two recesses 42 on opposite ends of the frame. Electrode D is mounted in the two recesses 42 and is slidable in the recess for horizontal movement. Thus electrode D may be positioned within two positions by moving the electrode to either the right or the left against stops 43 forming an integral part of the recess 42.

Sheets of foil C are formed of thin material such as stainless steel in rectangular sheets as particularly illustrated in Fig. 3. The bottom face 45 of each sheet C has printed thereon spaced parallel strips 46. Strips 46 are formed of material which has both a high dielectric and moisture content. Such a material, for example, may comprise a thin coating of about .0006 of an inch of material compounded from a formula such as herein set forth: 1 grain carbonate of magnesia; 11 min. 28% acetic acid; 100 grains titanium dioxide and 30 min. mucilage. In this formula the carbonate of magnesia is dissolved in the acetic acid until it is clear, then the titanium dioxide is added and then the mucilage. This material is applied to form strips 46 by painting.

Another compound for the stripping may comprise clay, titanium dioxide and a binder including acetic acid, gum arabic and sugar. Such a compound is highly dielectric and is sufficiently absorbent of moisture so as to maintain a high moisture content under normal conditions.

In operation the sheets of foil C are progressively placed on plate 24 and welded. The sheets are aligned with bottom face 45 having the strips 46 face down and with the strips 46 of each set disposed midway between the strips of the adjacent set and parallel therewith. The welding operation is effected by aligning welding electrodes 30 with top face 47 of the top sheet C so that the welding wheel is adapted to traverse a course longitudinal of, and aligned with strip 46 of the second sheet C to effect a weld between the top two sheets.

Electrode guide members 28 forcefully embrace face 47 of the top sheet C directly over strip 46 on the bottom face of the top sheet and welding wheel electrode 30 is disposed to ride between guides 28 midway between the strips.

An electrical circuit is created between the wheels and at least one of the adjacent guides so that a path of current is created from wheel 30 through top sheet C to the second sheet and thence through the two sheets back to the guide electrode 28. Where the welding wheel creates a point of pressure between the two sheets there will be effected a weld. The weld is directly over the strip 46 which is on the other side of the second sheet C so that the weld is unable to penetrate to the third sheet due to the electrical and thermal insulating qualities of the strip.

It is noted that the formulation of the material of which strip 46 is formed is adapted to absorb a quantity of moisture. For this reason when the weld is effected between the top two sheets the heat generated on the bottom face of the second sheet causes immediate evaporation of the liquid or moisture carried by the strip and immediately opposite the welded side of the second sheet. This evaporation causes a cooling along the welded node which prevents burning and stops heat transference between the second and third sheets so as to prevent the weld passing beyond the first two sheets. Thus the strips 46 provide the triple function of first preventing electrical current from passing through the sheets, secondly forming a thermo insulation between the second and third sheets between the welded node and thirdly creating a refrigerant due to the evaporation of the moisture carried by the strip which effectively cools the node.

Welding of a complete stack of sheets C is accomplished by alternating the sheets C so that insulating strips 46 of each sheet are midway between the insulating strips of the preceding sheet in the stack and establishing an electrical welding current between the guides and the wheels during a traverse of the wheel across the top sheet C midway between the two strips on the bottom face of the top sheet. The wheels are insulated from guides 28 by the insulating strips 33 which are mounted within grooves 32 of the guides so as to guide the wheels to traverse in a precise straight lineal path during welding.

After the stack of foil sheets have been welded together they may be extended to form substantially square shaped honeycomb cells.

In Fig. 4 there is provided a modification of the invention in which the welding wheel electrodes are formed with an offset rim as indicated at 60. The rim is offset so as to be substantially closer to one of the guides 28 than to the other thus creating a shorter distance between the portion of the wheel engaging top face 47 of the top sheet C and the adjacent electrode guide 28.

In still another modification of the invention as shown in Fig. 5 the insulation between the strips or sheets $C^1$ of foil is effected mechanically rather than by the provision of solid matter between the sheets. In this modification foil sheets $C^1$ are corrugated to provide welding nodes comprising small lineal protuberances 81 along rows substantially the same as the lines created by strips 46 in Fig. 3. The nodes are substantially triangular in cross-section and have their tips or apexes aligned exactly with the peripheral or engaging portion of welding wheels 30. Because of this structure the current is isolated from direct contact to the third sheet of material in that the current must go from the first to the second sheets and then down the walls of the node before reaching the third sheet. By this means and by proper adjustment of the current a weld can be created between the first two sheets and prevented from extending to between the second and third sheets.

The parts of the device are identical to the embodiment of Figs. 1, 2 and 3 except that the electrode guides are shown at 83 as comprising a top face 84 recessed at 85. Dielectric rollers 86 are mounted on axle 35 between electrode wheels 30 and are arranged to ride in recesses 85 so as to guide the wheels in the vertical and horizontal axis during the welding traverse of the wheels.

The bottom 87 of guides 83 are formed with a recess 88 which is aligned with the upwardly projecting protuberances 81 on the top sheet $C^1$.

In this modification the welding circuit is identical to the welding circuit in the embodiments of Figs. 1, 2, 3 and 4. However, unlike the embodiment of Figs. 1, 2, 3 and 4, air is the electrical and thermal insulator between the second and third sheets directly under the node.

In the drawings the electrodes have been described as comprising guide electrodes 28 and wheel electrodes 30 in which the guides are insulated from the wheels by insulating members 33 and in which the current is arranged to travel between the guides and the wheels. It is obvious that other arrangements can be used to establish the welding circuit. For example, the guides could be eliminated entirely and adjacent welding wheels could be supplied with opposite potential so as to complete a welding circuit between the wheels through the two nodes and the sheets of material.

The term "foil" as used herein and in the claims is not limited to any specific gauge or thickness of the sheet material used.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method of sequentially welding superposed sheets of foil to form an integral honeycomb structure comprising the steps of: forming electrical insulation along spaced parallel strips on one face of each sheet; placing a first and second said sheet together with the insulation sandwiched between the two sheets; electrically welding the two sheets together to form seams positioned and arranged between the coated strips sandwiched between the two sheets; placing a third sheet on the second sheet with one coated face sandwiched between the third and second sheet; and electrically welding said third sheet to said second sheet to form seams directly over the strips between said first and second sheets.

2. A method of sequentially welding superposed sheets of foil to form an integral honeycomb structure comprising the steps of: applying a coating of electrical and thermal insulating material along spaced parallel strips on one face of each sheet; placing a first and second said sheet together with one coated face sandwiched between the two sheets; electrically welding the two sheets together along seams positioned and arranged between the coated strips sandwiched between the two sheets; placing a third sheet on the second sheet with one coated face sandwiched between the third and second sheets; positioning the spaced strips sandwiched between said second and third sheets in alignment with and disposed midway between the coated strips sandwiched between said first and second sheets; and electrically welding said third sheet to said second sheet along lines aligned between the coated strips between said second and third sheets and over the coated strips sandwiched between said first and second sheets.

3. A method of sequentially welding superposed sheets of foil to form an integral honeycomb structure comprising the steps of: dividing one face of each sheet into first areas and second areas; applying a coating of electrical and thermal insulating material having a relatively high moisture content on the first areas of each said sheet but not on the second areas; placing a first and second sheet together with one coated face sandwiched between the two sheets; electrically welding the two sheets together at points within the second areas of the coated face between said first and second sheets; placing a third sheet on the second sheet with one coated face sandwiched between the second and third sheets; positioning the second areas of the coated area between said second and third sheets over the second areas of the coated area between said first and second sheets; and electrically welding said third sheet to said second sheet in the second areas of the coated face between said first and second sheets and directly over the coated face between said first and second sheets.

4. A method of sequentially welding superposed sheets of foil to form an integral honeycomb structure comprising the steps of: applying a coating of electrical insulating material on selected areas of one face of each sheet; placing said first and said second sheets together with one coated face sandwiched between the two sheets; electrically welding the two sheets together at points between the coated areas of the coated face between the two sheets by applying electrical current of opposite polarity simultaneously to two spaced points on the outer face of said second sheet; placing a third sheet on said second sheet with one coated face sandwiched between the second and third sheets; positioning said third sheet to position uncoated areas of the coated sheet between said second and third sheets in alignment with coated areas of the coated face between said first and second sheets; and welding said third sheet to said second sheet by applying electrical current of opposite polarity simultaneously to two spaced points on the outer face of said third sheet.

5. A method of sequentially welding superposed sheets of foil to form an integral honeycomb structure comprising the steps of: applying a coating of electrical insulating material on selected areas of one face of each sheet; placing said first and said second sheets together with one coated face sandwiched between the two sheets; electrically welding the two sheets together at points between the coated areas of the coated face between the two sheets by applying electrical current of opposite polarity simultaneously to two spaced points on the outer face of said second sheet; one of said points being aligned solely over the area between the coated areas of the face between said two sheets and the other of said points being aligned over a coated area of the face between said two sheets.

6. A method of sequentially welding superposed sheets of foil to form an integral honeycomb structure comprising the steps of: applying a coating of electrical insulating material on selected areas of one face of each sheet; placing said first and said second sheets together with one coated face sandwiched between the two sheets; electrically welding the two sheets together at points between the coated areas of the coated face between the two sheets by applying electrical current of opposite polarity simultaneously to two spaced points on the outer face of said second sheet; aligning one said electrode over the uncoated area of the face sandwiched between said second and third sheets and over the coated area of the coated face sandwiched between said second and first sheets; placing a third said sheet on said second sheet with one coated face sandwiched between the second and third sheets; positioning said third sheet to provide uncoated areas of the coated sheet between said second and third sheets in alignment with coated areas of the coated face between said first and second sheets; and welding said third sheet to said second sheet by applying electrical current of opposite polarity simultaneously to two spaced points on the outer face of said third sheet.

7. A method of sequentially welding superposed sheets of foil to form an integral honeycomb structure comprising the steps of: applying a coating of material having high dielectric and heat insulating properties and a substantial moisture content on first areas of one face of each sheet but not on second areas disposed between the first area; placing a first and second sheet together with a first coated face sandwiched between said sheets; and electrically welding said two sheets together at points within the second areas of the first face between the two sheets by applying electrical current of opposite polarity simultaneously to first and second spaced points on the outer face of said second sheet with at least one first point being aligned over a first area and at least one second point being aligned solely over a second area.

8. A method of sequentially welding superposed sheets of foil to form an integral honeycomb structure comprising the steps of: applying a coating of material having high dielectric and heat insulating properties and a substantial moisture content on first areas of one face of each sheet but not on second areas disposed between the first area; placing a first and second sheet together with a first coated face sandwiched between said sheets; electrically welding said two sheets together at points within the second areas of the first face between the two sheets by applying electrical current of opposite polarity simultaneously to two spaced points on the outer face of said second sheet with at least one of the two spaced points being aligned over the second area of said first face; placing a third sheet on said second sheet with a second coated face sandwiched between said second and third sheets; aligning said sheets to position said second face with the second areas of said second face aligned over first areas of said first face; and electrically welding the second and third sheets together at points within the second area of the second face by applying electrical current of opposite polarity simultaneously to two spaced points on the outer face of said third sheet and aligning one of said two spaced points over the second area of said second face and the first area of said first face.

9. A method of sequentially welding superposed sheets of foil to form an integral honeycomb structure comprising the steps of: applying a coating of material having high dielectric and heat insulating properties and a substantial moisture content on first areas of one face of each sheet but not on second areas disposed between the first area; placing a first and second sheet together with a first coated face sandwiched between said sheets; electrically welding said two sheets together at points within the second areas of the first face between the two sheets by applying electrical current of opposite polarity simultaneously to two spaced points on the outer face of said second sheet with at least one of the two spaced points being aligned over the second area of said first face; placing a third sheet on said second sheet with a second coated face sandwiched between said second face with the second areas of said second face aligned over first areas of said first face; electrically welding the second and third sheets together at points within the second area of the second face by applying electrical current of opposite polarity simultaneously to two spaced points on the outer face of said third sheet and aligning one of said two spaced points over the second area of said second face and the first area of said first face; and the other of said points being aligned over one of said first areas.

10. In an apparatus for welding superposed sheets of metal foil together to form an integral honeycomb structure the combination of: means integral to the sheets of metal foil to form parallel equidistantly spaced electrically and thermally insulated strips between each two superposed sheets; first electrode means disposed over the insulated strips separating the top sheet from the last superposed sheet; said electrode formed to provide elongated welding gaps aligned parallel with said strips; second electrode means disposed to traverse the top sheet in the gaps formed by said first electrode means; said second electrode means biased downwardly to force the top sheet against the last superposed sheet as said second electrode is transversely moved; and means to electrically energize said first and second electrodes with welding current whereby current is conducted between said first and second electrodes by the two superposed sheets to cause said top sheet to be welded to the last superposed sheet along lines between the insulated strips.

11. A method of welding superposed sheets of metal foil together to form an integral honeycomb structure comprising the steps of: applying means to electrically and thermally insulate superposed sheets from each other in parallel equidistantly spaced strips; placing two sheets in superposed position; traversing spaced electrically energized electrodes along the top sheet so that one of the two electrodes is in contact with the top of the top sheet over the insulated strip between the two sheets and the other is in contact with the top of the top sheet at positions between two of the insulated strips between the two sheets; and forcing the welding electrodes downwardly with sufficient pressure to cause the top two sheets to contact one another as the electrodes are transversely moved across the sheets.

12. In a three sheet stack of metal the combination of: mechanical spacers between each of the sheets in first areas but not in second areas; said spacers being sufficiently minute in thickness to allow physical contact of adjacent sheets at said second areas; said spacer means between a first pair of said three sheets being aligned within the second areas between a second pair of said three sheets; and electrical welds between said first pair of said three sheets within said second areas and between said second pair of said three sheets within said second areas and directly over the first area between said first pair of sheets.

13. In a stack of metal sheets to be welded having respectively superposed lower, middle and upper sheets the combination of: mechanical spacers between each pair of adjacent faces of said sheets positioned in spaced relation along one of said adjacent faces of each pair of adjacent faces to provide spaces between spacer means; said spacer means being of sufficiently diminutive thickness to allow physical contact of the sheets between spacer means; the spacer means between said upper and intermediate sheets being aligned over spacer means disposed between said intermediate and lower sheets.

14. A combination according to claim 16 and wherein said spacer means comprises a coating having thermal and electrical insulating properties and the ability to contain substantial moisture content.

15. In a welded stack of metal sheets having respectively superposed lower, middle and upper sheets the combination of: spacer means between each pair of adjacent faces of said sheets positioned in spaced relation along one face of each pair of adjacent faces to provide spaces between said spacer means; said spacer means being of sufficiently diminutive thickness to allow physical contact of the adjacent sheets between spacer means; the spaces between said upper and intermediate sheets being aligned over spacer means disposed between intermediate and lower sheets; and welds joining said lower and intermediate sheets together in the spaces between spacer means disposed between the lower and intermediate sheets and welds joining said intermediate and upper sheets together in the spaces between spacer means positioned between the upper and intermediate sheets and said welds aligned over the spacer means between said intermediate and lower sheets.

16. In a stack of metal sheets to be welded having respectively superposed lower, middle and upper sheets the combination of: mechanical spacers between each pair of adjacent faces of said sheets positioned in spaced relation along one of said adjacent faces of each pair of adjacent faces to provide spaces between spacer means; said spacer means being of sufficiently diminutive thickness to allow physical contact of the sheets between spacer means; the spacer means between said upper and intermediate sheets being aligned between the spacer means disposed between said intermediate and lower sheets.

References Cited in the file of this patent

UNITED STATES PATENTS

| | | |
|---|---|---|
| 1,670,700 | Weed | May 22, 1928 |
| 1,677,161 | Adams | July 17, 1928 |
| 1,744,797 | Pfeiffer | Jan. 28, 1930 |
| 2,163,590 | Ganahl et al. | June 27, 1939 |
| 2,445,801 | Partiot | July 27, 1948 |